A. G. REAMAN.
VEHICLE WHEEL.
APPLICATION FILED SEPT. 12, 1911.

1,027,434.

Patented May 28, 1912.
3 SHEETS—SHEET 1.

WITNESSES:

INVENTOR:
Abraham G. Reaman
by Chas N Riches
Atty

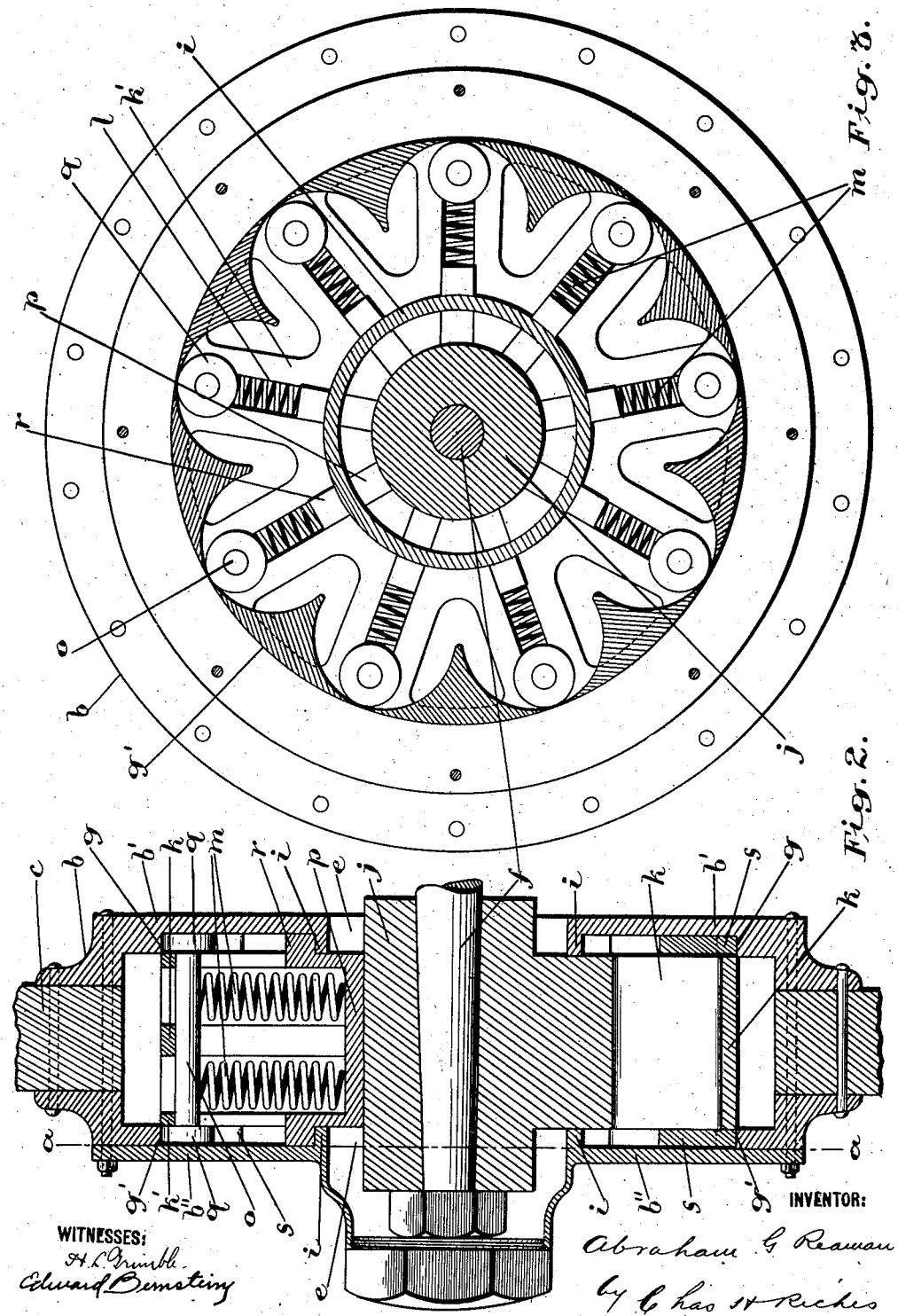

A. G. REAMAN.
VEHICLE WHEEL.
APPLICATION FILED SEPT. 12, 1911.

1,027,434.

Patented May 28, 1912.

3 SHEETS—SHEET 3.

WITNESSES:

INVENTOR:

UNITED STATES PATENT OFFICE.

ABRAHAM GROVE REAMAN, OF RINGWOOD, ONTARIO, CANADA.

VEHICLE-WHEEL.

1,027,434.  Specification of Letters Patent.  Patented May 28, 1912.

Application filed September 12, 1911. Serial No. 648,825.

*To all whom it may concern:*

Be it known that I, ABRAHAM GROVE REAMAN, of the village of Ringwood, in the county of York and Province of Ontario, Canada, blacksmith, have invented certain new and useful Improvements in Vehicle-Wheels; and I hereby declare that the following is a full, clear, and exact description of the same.

My present invention relates to that class of vehicle wheels in which the felly is yieldingly supported from the axle. In certain types of this class of wheel the felly is connected with the hub by yielding spokes, made in two parts one of which slides within the other, suitable springs being provided to resiliently hold the parts in their normal position, and these spokes, owing to their separable construction, lack rigidity, bend circumferentially and laterally under varying conditions of load and use, and permit of the wheel to buckle, and in some cases break.

My present invention further relates to the construction of a wheel with solid spokes rigidly uniting the felly and hub, and to the introduction into the hub of resilient elements surrounding the axle whereby the wheel can have limited radial movement relative to the axle when yielding to the condition of the load, and, the surface over which the wheel is traveling, the object of my invention being to so arrange these elements that the wheel will have the same resiliency as when provided with a pneumatic tire.

For an understanding of the invention reference is to be had to the following description and to the accompanying drawings in which:—

Figure 1:
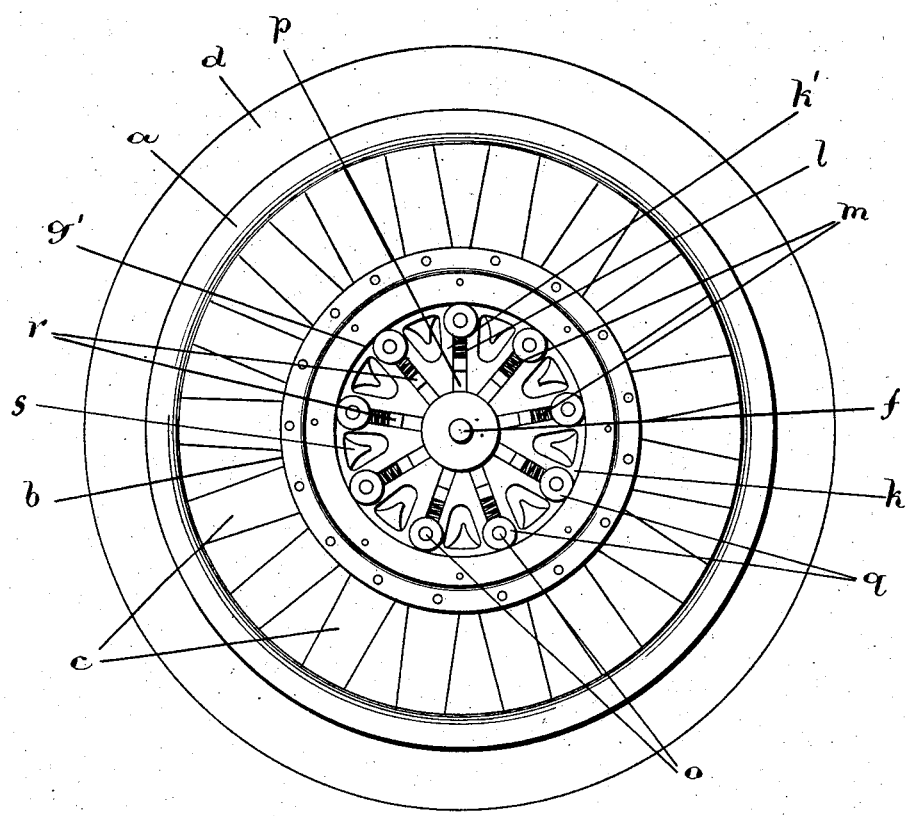
Figure 4:
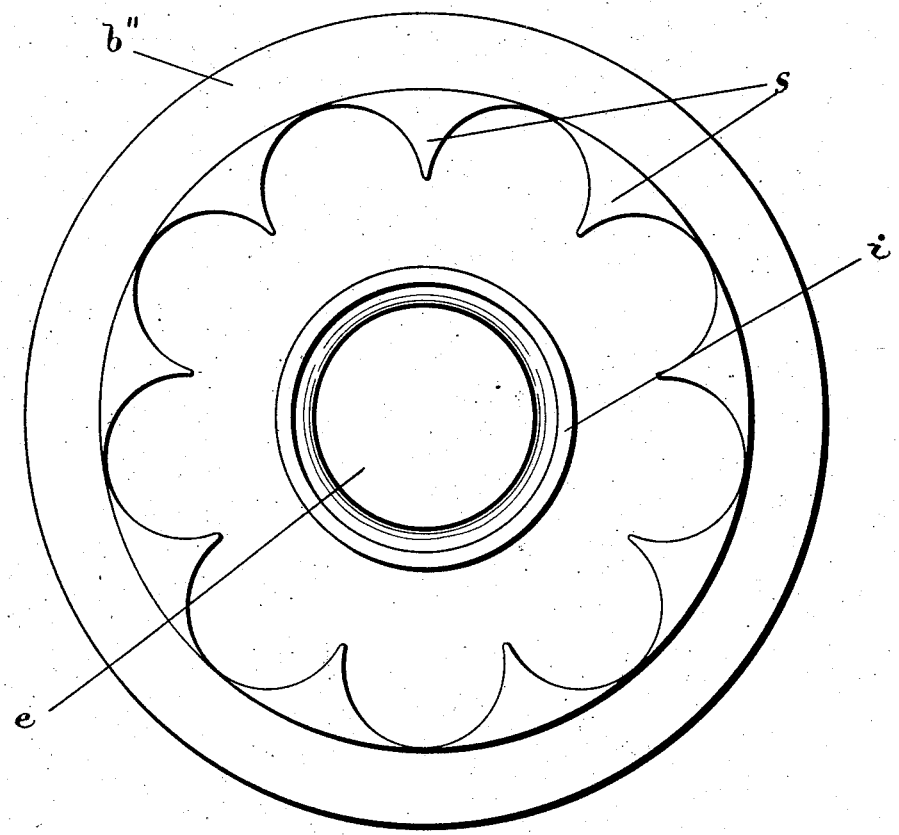

Figure 1, is a side elevation of a vehicle wheel, partly in section, showing the relative position and construction of the parts. Fig. 2, is a vertical section through the hub. Fig. 3, is a section on the line $a$—$a$ Fig. 2, and Fig. 4, is an elevation of one of the hub plates.

Like characters of reference refer to like parts throughout the specification and drawings.

In the construction of the wheel I connect the felly $a$ and the hub $b$ by rigid spokes $c$, the felly and spokes being similar to those now used, the hub being hollow, and, larger than the ordinary hub to receive the parts relating to my invention, and the felly being provided with a tire $d$ which may be of metal or solid rubber, as the wheel does not depend upon the tire for its resiliency.

The hub $b$ comprises two side plates $b'$, $b''$, spaced apart, each having a central bore $e$ of relatively greater diameter than the boxing for the axle $f$ to permit of a limited movement of the hub without coming into contact with the boxing or axle during the yielding movement of the wheel. The inner faces of the side plates are provided with annular rings $g$ $g'$, the ring $g$ being integral with the side plate $b'$, and the ring $g'$ being separate from, but bolted to, the side plate $b''$, to hold the spokes in position, and the inner faces of the side plates $b'$ $b''$ are provided with circular flanges $i$, concentric with the rings $g$ $g'$, and, adjacent to the bore $e$. Within the bore $e$ is the boxing $j$ for the axle arm $f$, the boxing being of relatively smaller diameter than the bore $e$ so that the wheel can yield radially from its normal position independently of the boxing without the edge of the bore coming into contact with the boxing.

Integral with the boxing $j$ is a drum $k$ having radial slots $l$ in its sides $k'$, and contained in the drum $k$ are cushioning springs $m$. The cushioning springs engage at their outer ends against movable bars $o$ transverse to the length of the cushioning springs $m$ and slidable radially with respect to the center of the boxing, and at their inner ends against similar sliding blocks $p$. The bars $o$ project beyond the sides of the drum $k$ and are provided with rollers $q$ engaging with the internal surfaces of the annular rings $g$ $g'$. The sliding blocks $p$ are provided with projections $r$ engaging with the peripheral surfaces of the circular flanges $i$. The inner surfaces of the side plates $b'$ $b''$ are provided with radial stops $s$ extending inwardly from the rings $g$ $g'$ to engage with the rollers $q$ and cause the united revolution of the wheel and boxing.

I have shown in Fig. 2, a boxing element provided with nine sets of cushioning springs, movable bars, rollers, and sliding blocks, but this number may be altered to meet different requirements under different conditions of use and size of wheel.

When the load is on the wheel, the axle $f$ forces the boxing $j$ and drum $k$ downward, compressing the lowermost set of springs $m$ against its respective bar *o*, the rollers of that bar resting forcibly on the annular surface of the rings *g g'*. It also, through the engagement of the projections *r* with the circular flanges *i*, causes the outward movement of the uppermost sliding blocks *p*, and the compression of their respective springs against the bars *o*. This causes the lowermost and uppermost springs to sustain the major part of the load on the wheel, the balance of the load being evenly distributed from the lowermost springs upward, and from the uppermost springs downward until the lines of force meet. In this way the entire load upon the wheel is distributed to all of the sets of springs, so that the hub, under normal use, will be constantly concentric with the boxing and axle, and under abnormal conditions of load and roadway it will be eccentric to the boxing. In such cases however the difference between the relative sizes of the bore and boxing compensates for the change in their relative positions.

Having thus fully described my invention what I claim as new and desire to secure by Letters Patent is:

In a vehicle wheel, a hub having a central bore for the boxing, said hub comprising two side plates, the inner faces of which are provided with annular flanges in juxtaposition to the bore, and other annular flanges near their outer ends, a boxing of relatively smaller diameter than the bore of the hub, comprising a drum provided with radial slots, movable elements slidably contained in the outer ends of said slots and provided beyond the sides of the drum with rollers engaging the annular flanges near the outer ends of the side plates, and movable elements slidably contained in the inner ends of the radial slots and engaging with the annular flanges of the side plates in juxtaposition to the bore, and springs contained in the radial slots bearing against the movable elements.

ABRAHAM GROVE REAMAN.

Signed in the presence of—
 JOHN R. BUTTON,
 DAVID FORSYTH.